United States Patent [19]

Re et al.

[11] 3,728,397
[45] Apr. 17, 1973

[54] DIOL DIONE COMPOUNDS AND METHOD OF MAKING SAME

[75] Inventors: Luciano Re, Meyrin/Geneva; Günther Ohloff, Bernex/Geneva, both of Switzerland

[73] Assignee: Firmenich & Cie, Geneva, Switzerland

[22] Filed: Dec. 12, 1969

[21] Appl. No.: 889,811

Related U.S. Application Data

[62] Division of Ser. No. 736,269, June 12, 1968, Pat. No. 3,576,014.

[30] Foreign Application Priority Data

June 16, 1967 Switzerland..........................8620/67
June 5, 1968 Switzerland..........................8254/68

[52] U.S. Cl.................................................260/594
[51] Int. Cl...............................................C07c 49/12
[58] Field of Search .......................260/594 R, 593 R

[56] References Cited

UNITED STATES PATENTS

2,175,581 10/1939 Vaughn ..........................260/593 R
2,789,141 4/1957 Friederich et al.................260/593 R

OTHER PUBLICATIONS

Re et al., Chem. Abs. 72, 42,809n (1970).
Re et al., Chem. Abs. 72, 31,598s (1970).

*Primary Examiner*—Daniel D. Horwitz
*Attorney*—Pennie, Edmond, Morton and Adams

[57] ABSTRACT

A process for the preparation of dioldione compounds of the formula

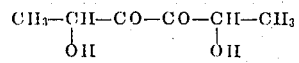

by ozonizing an reducing a compound of the formula

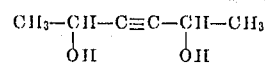

4 Claims, No Drawings

DIAL DIONE COMPOUNDS AND METHOD OF MAKING SAME

This application is a division of our application Ser. No. 736,269, filed June 12, 1968, now issued as U. S. Pat. No. 3,576,014.

The present invention relates to a novel process for preparing dihydrofuran derivatives of formula

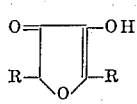
I wherein one of the symbols R means a methyl radical and the other one an ethyl radical or wherein both symbols R represent methyl radicals. The compounds of formula I possess valuable organoleptic properties and are, therefore, useful as flavouring agents and as fragrances. The invention also relates to those compounds of formula I wherein one of the R's is ethyl and which are new substances. The invention furthermore relates to new intermediates used in the said new process and to methods for preparing them.

A known method for preparing 2,5-dimethyl-4,5-dihydro-furan-3-ol-4-one (formula I, both R's = methyl) consists in heating rhamnose in the presence of piperidine acetate (cf. Proc. Am. Soc. Brewing Chemists 84 (1963)). The starting rhamnose is a relatively expensive natural product which can be obtained only in small insufficient quantities and which, therefore, is not a suitable starting material for the commercial production of the said dihydrofuran derivative.

Another known method for preparing 2,5-dimethyl-4,5-dihydrofuran-3-ol-4-one comprises hydrogenolising acetylformoin by treating the latter with hydrogen in the presence of a palladium-carbon-catalyst and purifying the crude product by chromatography on silica (cf. Helv. Chim. Acta 49, 53 (1966)). The yield of pure product is only about 10 percent of the theory.

A further known method for preparing 2,5-dimethyl-4,5-dihydrofuran-3-ol-4-one consists in catalytically hydrogenating 2,5-dihydroxymethyl-3,4-dibenzoxyfuran (cf. J.Org.Chem. 31, 2,391 (1966)). The main disadvantage of this method resides in the fact that the synthesis of the intermediate 2,5-dihydroxy-methyl-3,4-dibenzofuran requires four chemical steps. Furthermore, the overall yield of the desired product amounts to about 6.5 percent of the theory only.

The known methods described above are non-economical laboratory methods which cannot be applied to the production of the said dihydrofuran derivative on a commercial scale. It has now been found that the compounds of formula I can be obtained easily and economically from new intermediates which are derived from cheap starting materials available commercially in unlimited quantities.

The process according to the invention comprises cyclising, in the presence of a cyclisation catalyst, a diol-dione compound of formula

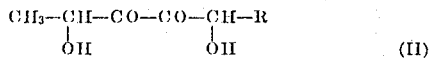
(II)

wherein R represents an ethyl or a methyl radical.

For the cyclisation which proceeds with elimination of one molecule of water, cyclisation catalysts such as proton donors for instance mineral or organic acids can be used. These include hydrochloric acid, sulphuric acid, phosphoric acid, oxalic acid, acetic acid, malonic acid, tartaric acid, trifluoroacetic acid and acid buffers resulting from acidic mixtures of said acids and alkali or amine salts thereof for instance acid buffers such as mixtures of phosphoric acid and sodium or ammonium phosphate, mixtures of sulphuric acid and potassium sulphate, mixtures of hydrochloric acid and ammonium chloride or acetic acid and piperidine acetate or oxalic acid and triethylamine oxalate or trifluoracetic acid and pyridine trifluoracetate. Preferred cyclisation catalysts are hydrochloric and oxalic acids.

The removal of the water eliminated during the cyclisation from the cyclisation mixture is not necessary for obtaining a good yield of cyclised product. The cyclisation can be performed in aqueous solutions, for instance mixtures of water and hydrophilic solvents such as methanol, ethanol, dioxan, tetrahydrofuran and dimethoxyethane. A preferred class of solvents includes pure water, methanol-water or ethanol-water mixtures. According to the mass action laws it was to be expected that the presence of water would inhibit the cyclisation. However, not only the water formed during the cyclisation but also the additional water present in the reaction medium have no detrimental effect on the course of the cyclisation.

The cyclisation can be carried out at temperatures comprised between 50° and 150° C, preferably at the reflux temperature of the reaction mixture, under an inert atmosphere for instance nitrogen or $CO_2$.

The compounds of formula II are new and can be obtained according to the invention by ozonation of the corresponding acetylenic diols of formula

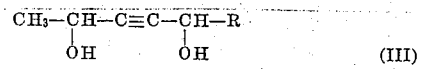
(III)

wherein R is an ethyl or methyl radical, and subsequent reduction of the intermediate ozonide by means of a reducing agent. The ozonation can be performed according to usual ozonation procedures for instance by bubbling into a solution of the acetylenic compound gaseous mixtures of 1 to 5 percent ozone in oxygen at temperatures below 0°, preferably between −12° and −8°.

The ozonation can be carried out in the presence of polar organic solvents such as acetone, methanol, ethanol or isopropanol, or organic acids such as acetic, formic and propionic acids. Low boiling alcohols such as methanol or ethanol and acetic acid are a preferred class of solvents for the ozonation since they also stabilise the intermediate ozonide by formation of alkoxyhydroperoxides and acetoxyhydroperoxides, respectively.

The intermediate ozonide can be reduced to the dioldione by using agents such as alkali iodides, e.g. lithium, potassium or sodium iodides, organic sulphides, e.g. methyl, ethyl, propyl or butyl sulphides or an aromatic or aliphatic tertiary phosphine for instance triphenylphosphine, tritolylphosphine, tributylphosphine, trihexylphosphine. Triphenylphosphine is a preferred reducing agent.

The process according to the invention offers several advantages over the prior art methods for preparing 2,5-dimethyl-4,5-dihydrofuran-3-ol-4-one with regard to yields, cost of manufacture and availability of starting materials.

Indeed, the compound of formula III wherein R is a methyl radical is an easily available commercial product. The compound of formula III wherein R is an ethyl radical is new. It can be prepared easily according to the invention by a Grignard type addition of the bromo-magnesium derivative of 1-butyn-3-ol to propionaldehyde followed by hydrolysis according to known methods [cf. for instance Z. Obsch. Khim. 18, 1,332 (1948)]. The bromo-magnesium derivative of 1-butyn-3-ol is obtained as usual from the said alcohol and ethylmagnesium bromide. The following scheme illustrates the method of preparation

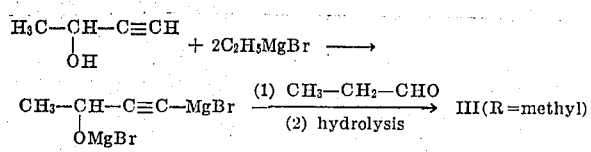

2-Methyl-5-ethyl-4,5-dihydrofuran-3-ol-4-one (isomer A) and 5-methyl-2-ethyl-4,5-dihydrofuran-3-ol-4-one (isomer B), which are both new compounds, are obtained when heptane-2,5-diol-3,4-dione is used as the starting compound in the process according to the invention. A and B are obtained as a mixture in proportions by weight of about 2 : 1. They can be separated for instance by molecular distillation in vaccuo at bath temperatures not exceeding 50° C. or by counter-current extraction. Both isomers have interesting organoleptic properties and are, therefore, useful as flavouring agents, in particular for flavouring foodstuffs, beverages and pharmaceutical preparations. Furthermore, they can be used as ingredients in artificial flavours, especially fruit flavours such as raspberry, strawberry, gooseberry flavours and the like. Isomers A and B are also useful as reinforcing agents for improving or strenghtening the flavours of fruit juices, fruit pulps, jams and canned fruit. As distinct from 2,5-dimethyl-4,5-dihydrofuran-3-ol-4-one which developps a characteristic strawberry-like flavour the said isomers A and B have different flavouring properties insofar as they develop a weaker and non-specific fruity flavour note but a strong cooked flavour note. Thus, e.g., if minute quantities of a mixture of isomers A and B is added to a natural raspberry syrup a flavour note of cooked raspberry is imparted to the syrup. The same effect is obtained in various other fruit flavours. Isomers A and B are particularly useful for enhancing the flavour and taste of various fruit jams and canned fruit.

The quantities of isomers A and/or B which have to be used in order to produce the desired flavouring effects vary within wide limits according to the nature of the material to be flavoured. As an average, good results are obtained in modifying or enhancing the flavour and taste of foodstuffs, e.g. fruit jams, and beverages with proportions of 5 to 15 mg. of isomers A and/or B for one kilogram of foodstuff or beverage. However, these figures should not be construed as limitations. Higher or lower proportions can be used depending on the desired flavour effects.

For practical flavouring purposes it is not necessary to separate the two isomers since their flavouring properties are substantially identical. Thus, a mixture of both isomers as it is obtained in the cyclisation of heptane-2,5-diol-3,4-dione according to the invention can be used as a flavour-modifying agent.

Surprisingly, the flavouring strength of 2-methyl-5-ethyl-4,5-dihydrofuran-3-ol-4 (isomer A) and 2-ethyl-5-methyl-4,5-dihydrofuran-3-ol-one-4 was found to be at least as high as that of 2,5-dimethyl-4,5-dihydrofuran-3-ol-4-one. This was unexpected since in the case of other furan derivatives the addition of a further methyl group results in a substantial loss of the flavouring strength. Thus, for instance, the flavouring strength of 5-methyl-furfural is from 5 to 10 times lower than that of furfural.

The invention and its embodiments are further illustrated by the following Examples.

EXAMPLE 1

Preparation of 5-methyl-2-ethyl-4,5-dihydrofuran-3-ol-4-one and 2-methyl-5-ethyl-4,5-dihydrofuran-3-ol-4-one a. 3-heptyne-2,5-diol To a stirred suspension of magnesium turnings (48.6 g.) in ether (500 ml.), a solution of ethyl bromide (153 ml.) in ether (180 ml.) was added dropwise in the course of 4½ hours at such a rate that the heat of reaction would maintain the mixture at reflux temperature. During this period the reflux condenser was kept at −10° C in order to prevent escaping of the ethyl bromide.

The reaction mixture was cooled and a solution of 1-butyne-3-ol (70.1 g.) in ether (90 ml.) was added dropwise between 0° and 5° in the course of 3½ hours. This resulted in a pasty mass which was resuspended by the addition of 500 ml. of benzene. The mixture was stirred for 2 hours at 47°–50° (bath-temperature) then cooled down to −5° C. Then a solution of proprionaldehyde (63.9 g., 79 ml.) in benzene (80 ml.) was added dropwise with stirring during a period of 20 minutes. The mixture was stirred overnight at room temperature then poured slowly into a saturated ammonium chloride solution ( 2 l.), keeping the temperature below 15° C. by means of external cooling. The pH of the mixture was adjusted to a value of 6 by the dropwise addition of concentrated HCl, then the organic layer was separated and the aqueous layer evaporated to dryness under vacuum at a temperature below 60° C. The residue was extracted several times with chloroform and the combined extracts, after having been dried over anhydrous $Na_2SO_4$, were concentrated under vacuum. The resulting brown oil (118 g.) was flash-distilled and gave 106 g. of 3-heptyne-2,5-diol having a b.p. of 83°–83.5°/0.1 Torr and a purity of 94 percent according to vapour phase chromatography analyses. Yield 77 percent.

b. Heptane-2,5-diol-3,4-dione

A gaseous stream containing 4.5 g. of $O_3$ per 100 l. of $O_2$ was introduced at the rate of 90 l. of gas/hour into a solution of 128 g. of 3-heptyne-2,5-diol in 1.3 l. of methanol cooled to −10° C. After about 10 hours the extent of ozone consumption in the reaction mixture was checked by means of the usual sodium iodide-sodium thiosulphate test and shown to be about 90 percent of the theory. The ozonation was stopped and into the mixture cooled between −20° and −30° C. a solution of triphenylphosphine (262 g.) in ether (1.2 l.) was added dropwise with stirring. During this period the temperature was kept below 0° C. The volatile solvents were removed under vacuum and in order to separate the product from the triphenylphosphine oxide, the residue was extracted carefully with water warmed to 50° C. (3 portions of 1 l. each). The combined water extracts were usually used directly in the following cyclisation step (see paragraph c) below. For the isolation of the diodione the above water extracts were shaken with ethyl acetate and the organic layer was separated, dried and concentrated under vacuum (bath temperature 35° C.). A pale yellow solid (yield 75 percent) was thus obtained, the purity of which was 80 percent or better according to the vapour phase chromatography analyses. When desired, the substance could be redissolved in water and cyclised according to the procedure described below.

c. Cyclisation of heptane-2,5-diol-3,4-dione

The combined water extracts separated from the residual phosphine oxide according to b) above were concentrated under vacuum until the total volume of the solution was reduced to about 1.5 l. Oxalic acid dihydrate (60 g.) was added and the solution heated to the boil under nitrogen for 6 hours. After cooling, the solution was brought to pH 6–6.5 by means of a 20 percent KOH solution then it was continuously extracted for 40 hours with ether (1 l.). The ether extract was dried and after being vacuum-distilled gave a 2 : 1 mixture of 2-methyl-5-ethyl-4,5-dihydrofuran-3-ol-4-one (A) and 5-methyl-2-ethyl-4,5-dihydrofuran-3-ol-4-one (B), yield 70 percent, b.p. 63°–66° C./0.015 Torr. The above mixture was used directly to flavour foods and beverages.

The mass spectrum of the above mixture gave the following main results: m/e 142 (66), 99 (18), 71 (42), 57 (97), 43 (100). Isomers A and B were isolated by counter-current solvent partition extraction using water as the heavy phase and a mixture of pentane and hexane as the light phase. They gave the following characteristic NMR data.

| groups | H resonance A | $\delta$ ppm B |
|---|---|---|
| Methyl (isolated) | 2.23, s | 1.41, d, J=cps |
| Methyl (from ethyl radical) | 0.97, t, J=cps | 1.24, t, J=cps |
| Methylene (from ethyl radical) | — | 2.61, q, J=cps |
| Hydroxy | 7.1 | 7.1 |

EXAMPLE 2

Preparation of 2,5-dimethyl-4,5-dihydrofuran-3-ol-4-one a. Hexane-2,5-diol-3,4-dione A gaseous stream containing 4.5 g. of $O_3$ per 300 l. of $O_2$ was bubbled at the rate of 90 l. of gas/hour in a solution of 114 g. of sym-hexyne-2,5-diol in 1.3 l. of methanol cooled to −10° C. After about 10 hours the extent of ozone consumption in the reaction mixture was checked by means of the usual sodium iodide-sodium thiosulphate test and shown to be about 90 percent of the theory. The ozonation was stopped and into the mixture cooled between −20° and −30° C a solution of triphenylphosphine (262 g.) in ether (1.2 l.) was added with stirring. During the reduction the temperature was maintained below 0° C. The volatile solvents were removed under vacuum and in order to separate the product from the residual triphenylphosphine oxide, the residue was extracted twice with water (1 liter fractions). The combined water extracts were shaken with ethyl acetate and the organic layer was separated, dried and concentrated under vacuum. 146 g. of crude hexane-2,5-diol-3,4-dione, 75 percent pure according to vapour phase chromatography analysis, and corresponding to 110 g. of pure product were thus obtained. Yield 75 percent. This product could be used directly for the cyclisation reaction without further purification (see paragraph b) below).

b. Cyclisation of hexane-2,5-diol-3,4-dione

Crude hexane-2,5-diol-3,4-dione (50 g.) and oxalic acid dihydrate (20 g.) was dissolved in 500 ml. of water. The solution was heated to the boil for 4 hours under nitrogen. After cooling the pH of the solution was adjusted to a value of 6–6.5 by the addition of 20 percent KOH solution. The solution was filtered and continuously extracted for 40 hours with 300 ml. of ether. The ether was removed from the extract under vacuum and the residue was purified bu sublimation (bath temperature 70°–80°, pressure 0.01 Torr) and gave a 75 percent yield of pure 2,5-dimethyl-4,5-dihydrofuran-3-ol-4-one, m.p. 77°–79°.

EXAMPLE 3

Preparation of hexane-2,5-diol-3,4-dione

A solution of sym-hexyne-2,5-diol (46 g.) in methanol (450 ml.) was ozonised according to the method described in Example 2. When the ozonation was terminated a solution of methyl sulphide (32 g.) in methanol (100 ml.) was added dropwise with stirring, between −10° and 0° C, to the ozonide mixture. After stirring the mixture for an additional hour between −10° and 0°,, hour at 0° and 1 hour at room the temperature solvents were removed under vacuum (bath temperature below 35° C). By distilling the residue under a pressure of 0.05 Torr, dimethylsulphoxide was eliminated. The product remaining in the distillation vessel was diluted with chloroform, filtered and again concentrated under vacuum. This gave crude hexane-2,5-diol-3,4-dione which could be cyclised without further purification by the method described in Example 2.

EXAMPLE 4

Cyclisation of hexane-2,5-diol-3,4-dione

A solution of 15.5 g. of hexane-2,5-diol-3,4-dione, prepared according to Example 3, 1 ml. of HCl in 150 ml. of water was heated to the boil for 6 hours under nitrogen. After neutralisation with 5 percent KOH solution, the mixture was treated as described in Example 2, paragraph b) and gave 2.9 g. of pure 2,5-dimethyl-4,5-dihydrofuran-3-ol-4-one, m.p. 77°–79° C.

The following Examples illustrate the use of 2-methyl-5-ethyl-4,5-dihydrofuran-3-ol-4-one (isomer A) and 2-ethyl-5-methyl-4,5-dihydrofuran-3-ol-4-one (isomer B) as flavouring agents.

EXAMPLE 5

A raspberry syrup was prepared by diluting 5 g. of a natural raspberry concentrate with 1 liter of 30 percent aqueous sugar solution. The resulting syrup was devided into two equal portions. To one of these portions 5 mg. of an additive consisting of a mixture of isomers A and B (ratio by weight about 2 : 1) was added. The other syrup portion was used as a control for comparison purposes. Both syrups were tasted by several persons which agreed that the syrup containing the additive had a distinct cooked raspberry flavour note as compared with the control syrup having a more fresh raspberry flavour and taste.

The same experiment was carried out using a natural strawberry concentrate. Again, the syrup portion containing the additive was found to have a cooked raspberry flavour note which was not present in the control syrup.

EXAMPLE 6

An artificial green gooseberry flavour was prepared by mixing the following ingredients:

| Ingredients | Parts by weight |
|---|---|
| Vanillin | 0.20 |
| Ethyl caproate | 0.50 |
| Allyl caproate | 0.50 |
| Isobutyl caproate | 0.50 |
| Ethyl pelargonate | 0.50 |
| Isovalerianic aldehyde | 0.05 |
| Methyl-phenyl-carbinyl acetate | 0.05 |
| Anisalcohol | 0.20 |
| Raspberry ketone | 0.20 |
| Ethyl benzoate | 0.20 |
| Methyl-phenyl-carbinyl isobutyrate | 0.10 |
| Geraniol | 0.20 |
| Green cognac oil | 0.20 |
| Ethyl butyrate | 2.00 |
| Ethyl acetate | 2.00 |
| Triacetine | 2.60 |
| Total: | 10.00 |

1 part by weight of this mixture was diluted with 9 parts by weight of propylene glycol. 1 g. of the diluted gooseberry flavour was added to one liter of a 30 percent aqueous sugar solution. The resulting syrup was divided into two equal portions. To one of these portions 10 mg. of an additive consisting of a mixture of isomers A and B (ratio by weight about 2 : 1) was added. The other syrup portion was used as a control for comparison purposes. Both syrups were tasted by several persons which agreed that the syrup containing the additive had a distinct cooked gooseberry flavour note as compared with the control syrup having a more fresh gooseberry flavour and taste.

We claim :

1. As a new composition of matter, diol-dione compounds of formula

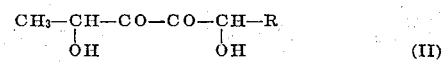   (II)

wherein R represents a methyl or ethyl radical.

2. Hexane-2,5-diol-3,4-dione.
3. Heptane-2,5-diol-3,4-dione.
4. A process for the preparation of diol dione compounds of the formula

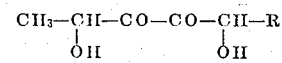

wherein R represents a methyl or ethyl radical which comprises treating acetylenic diols, of formula

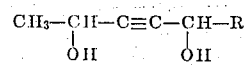

wherein R represents a methyl or ethyl radical, with an ozonizing agent comprising ozone in a polar solvent and at a temperature below 0° C. for a time sufficient to form the corresponding ozonide, and reducing the resulting ozonide to the corresponding diol-dione by means of a reducing agent selected alkali iodides, organic sulphides, and aromatic or aliphatic tertiary phosphines.

* * * * *

UNITED STATES PATENT OFFICE
CERTIFICATE OF CORRECTION

Patent No. 3,728,397                    Dated April 17, 1973

Inventor(s)  Luciano Re et al.

It is certified that error appears in the above-identified patent and that said Letters Patent are hereby corrected as shown below:

Column 2, line 13, "eliminated" should read -- formed --.
Column 3, line 17, "(R=methyl)" should read -- (R=ethyl) --.
Column 5, line 43, "1.41,d,J=cps" should read -- 1.41,d,J=7cps --;
line 44, "0.97,t,J=cps" should read -- 0.97,t,J=7cps --;
line 44, "1.24,t,J=cps" should read -- 1.24,t,J=7cps --; line 45,
"2.61,q,J=cps" should read -- 2.61,q,J=7.5cps --; line 53,
"per 300 l." should read -- per 100 l. --. Column 6, line 20,
"by" should read -- by --; line 35, "0°,," should read
-- 0°, --.

Signed and sealed this 19th day of February 1974.

(SEAL)
Attest:

EDWARD M. FLETCHER, JR.                C. MARSHALL DANN
Attesting Officer                      Commissioner of Patents

UNITED STATES PATENT OFFICE
CERTIFICATE OF CORRECTION

Patent No. 3,728,397  Dated April 17, 1973

Inventor(s) Luciano Re et al.

It is certified that error appears in the above-identified patent and that said Letters Patent are hereby corrected as shown below:

The abstract should read:

A process for the preparation of diol dione compounds of the formula

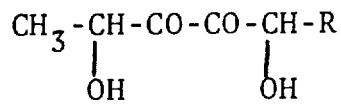

wherein R represents a methyl or ethyl radical which comprises ozonizing acetylenic diols, of formula

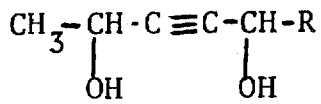

wherein R represents a methyl or ethyl radical.

Signed and sealed this 20th day of August 1974.

(SEAL)
Attest:

McCOY M. GIBSON, JR.
Attesting Officer

C. MARSHALL DANN
Commissioner of Patents